United States Patent
Andersen

[19]

[11] Patent Number: 6,085,774
[45] Date of Patent: Jul. 11, 2000

[54] INFLATION VALVE FOR SACKS, BAGS OR THE LIKE CONTAINERS

[75] Inventor: Carsten Andersen, Aars, Denmark

[73] Assignee: Bates Korsnas A/S, Norresundby, Denmark

[21] Appl. No.: 09/284,065

[22] PCT Filed: Oct. 16, 1997

[86] PCT No.: PCT/DK97/00454

§ 371 Date: Apr. 7, 1999

§ 102(e) Date: Apr. 7, 1999

[87] PCT Pub. No.: WO98/16767

PCT Pub. Date: Apr. 23, 1998

[30] Foreign Application Priority Data

Oct. 16, 1996 [DK] Denmark ................... 1148/96

[51] Int. Cl.[7] ............................................. F16K 15/20
[52] U.S. Cl. ............................. 137/223; 251/149.2
[58] Field of Search ............................ 137/223, 227, 137/228, 229; 251/149.1, 149.2

[56] References Cited

U.S. PATENT DOCUMENTS

| | | |
|---|---|---|
| 3,785,395 | 1/1974 | Andreasson . |
| 4,102,364 | 7/1978 | Leslie et al. . |
| 5,090,448 | 2/1992 | Truchet ................ 251/149.2 X |
| 5,326,072 | 7/1994 | Wuthrich ................ 251/149.2 |
| 5,437,301 | 8/1995 | Ramsey . |
| 5,651,403 | 7/1997 | Andersen ................ 137/223 X |
| 5,839,488 | 11/1998 | Peters ................ 137/223 X |
| 5,862,843 | 1/1999 | Corbitt, III ................ 137/223 X |

FOREIGN PATENT DOCUMENTS 359 908  9/1973  Sweden .

Primary Examiner—Denise L. Ferensic
Assistant Examiner—Meredith H. Schenfeld
Attorney, Agent, or Firm—Pillsbury Madison & Sutro LLP

[57] ABSTRACT

A flange (2) with a circular cylindrical opening (4) is provided in an inflation valve (1) for a container with non-rigid walls which is to be air pressurized, said flange (2) being secured to the container. A filling nozzle (6) communicating with a valve body (9) is mounted with an O-ring (7) in the opening (4) of the tubular part (3). According to the invention the valve body (9) with the filling nozzle (6) is pivotally arranged in the tubular part (3) and provided with a conical inner wall (13) to which a conical valve member (16) is secured. The valve member closes a gas supply passage (14) provided with a snugly fitting opening (15) for receiving a gas supply tube (18), one end (19) thereof adapted to mechanically pushing the valve member (16) aside at insertion of the gas supply tube (18) such that the inflation valve (1) is opened.

8 Claims, 2 Drawing Sheets

INFLATION VALVE FOR SACKS, BAGS OR THE LIKE CONTAINERS

This application is the national phase of international application PCT/DK97/00454 filed Oct. 16, 1997 which designated the U.S.

TECHNICAL FIELD

The invention relates to an inflation valve of the type described in the preamble to claim 1.

BACKGROUND ART

An inflation valve of this type is known from the applicant's own European Patent No. 0.659.146. The applicant's earlier inflation valve is formed of two parts, viz. a lower part attached as a form of handle to the flange of the container and a valve holder communicating with said lower part by means of a hinge. In use these parts are pivoted around the hinge and thus in its open state the inflation valve extends considerably beyond the surface of the sack. This is disadvantageous in that often no space is available between the sack and the goods whose stability and retainment are to be ensured during transit by means of the container or air bag. In the applicant's previous construction a hose for the inflation of air is secured to the side of the valve holder facing away from the flange by means of a gripping coupling. The hose and its fitting thus extend further away from the surface of the sack and prevent handling of the inflation valve in the often narrow and small voids between the objects being loaded into the storage compartment, thus securing the cargo against movement during transit.

EP patent No. 0 466 312 discloses another type of valve for the same purpose. In use the container is only provided with a pre-attached flange whose tubular nozzle extending from the container is provided with a collar to which a valve member formed as a clamp may be secured after the container is arranged in the void in which it is to be used. Engagement of the valve member takes place in any radial direction perpendicular to the axis of the valve. It is however not possible to turn the valve member with the inflation hose to enable inflation from all sides when the valve member is clamped on the flange. A valve is provided on the inflation nozzle secured to the container, said valve being opened mechanically by the nozzle tip engaging the end of the stem of said valve. The valve member is in itself comparative complex with several compression springs and various mechanically moveable parts inter alia ensuring automatic closure when the valve member is removed from the inflation nozzle.

U.S. Pat. No. 5,437,301 discloses a third inflation valve for the above object. This inflation valve limits the ability of the bottom portion of valve body to pivot relative to the valve body per se. The reason why is not to allow inflation of the container from all possible sides by turning the air inlet hose, but to allow the opening of an air exhaust passage if the container is to be deflated. The exhaust passage is furthermore connected to a muffler. The valve known from this publication is complex and also comprises springs and movable parts resulting in a comparatively expensive manufacture thereof.

BRIEF DESCRIPTION OF THE INVENTION

The object of the invention is to provide a simple valve construction without the use of threads or mechanical parts. Furthermore, it is desirable that the inflation valve is as compact as possible in the direction perpendicular to the surface of the container at the place where the inflation valve is mounted. Moreover it is desirable to enable inflation from all sides of the container and to obtain valve tightness without a subsequent insertion of a closure plug and without the use of a complex non-return valve. Finally, it is essential that the valve construction allows a measurement of the pressure in the container.

This object is according to the invention obtained by the inflation valve stated in the introduction being characterised by the subject-matter stated in the characterising clause of claim 1.

By the use of the inflation valve according to the invention the valve flap or—in the preferred embodiment—the conical valve member as well as the sealing connection, preferably in form of an O-ring, are secured to the valve nozzle which is subsequently mounted on the flange comprising the plate-shaped part with which the flange is secured to the container. Prior to the inflation of air it is then merely necessary to insert one end of the gas supply tube until the frontmost end of said tube presses the valve flap or the valve member away from the wall of the valve chamber and thus opens the valve.

As stated in claim 2 a circumferential collar is provided at the connection between the filling nozzle and the valve body, said collar acting as a stop means at the above mounting when the valve body is secured in the cylindrical portion of the flange. Accordingly the sealing ring in the circumferential groove of the filling nozzle is also arranged correctly in the cylindrical portion of the flange.

Claim 3 states the preferred embodiment in which the inner face of the valve body is shaped as a conical surface wherein the cone-shaped valve member is secured.

As stated in claim 4 when the cone angle of the valve member slightly exceeds the cone angle of the valve body, an almost linear sealing face is obtained along the outer face of the valve member on the rim thereof facing the filling nozzle.

The features stated in claim 5 allow for an easy mounting of a pressure gauge on the lateral face of the gas supply tube.

As stated above the sealing ring between the filling nozzle and the cylindrical portion of the flange is preferably an O-ring.

Since the end of the gas supply tube opening the valve member is provided with a push means preventing the mouth of the gas supply tube from engaging the valve member, a free air flow passage is obtained during inflation of the container as well as during a possible subsequent deflation of the container.

Preferably the gas supply tube has a stop face abutting the mouth of the gas supply passage in the valve body when the gas supply tube is inserted. As a result the maximum or optimum depth of insertion of the gas supply tube is indicated, thus avoiding damaging the valve member.

BRIEF DESCRIPTION OF THE DRAWINGS

The invention is explained in greater detail below with reference to the accompanying drawings, in which.

BEST MODE FOR CARRYING OUT THE INVENTION

Figure 1:
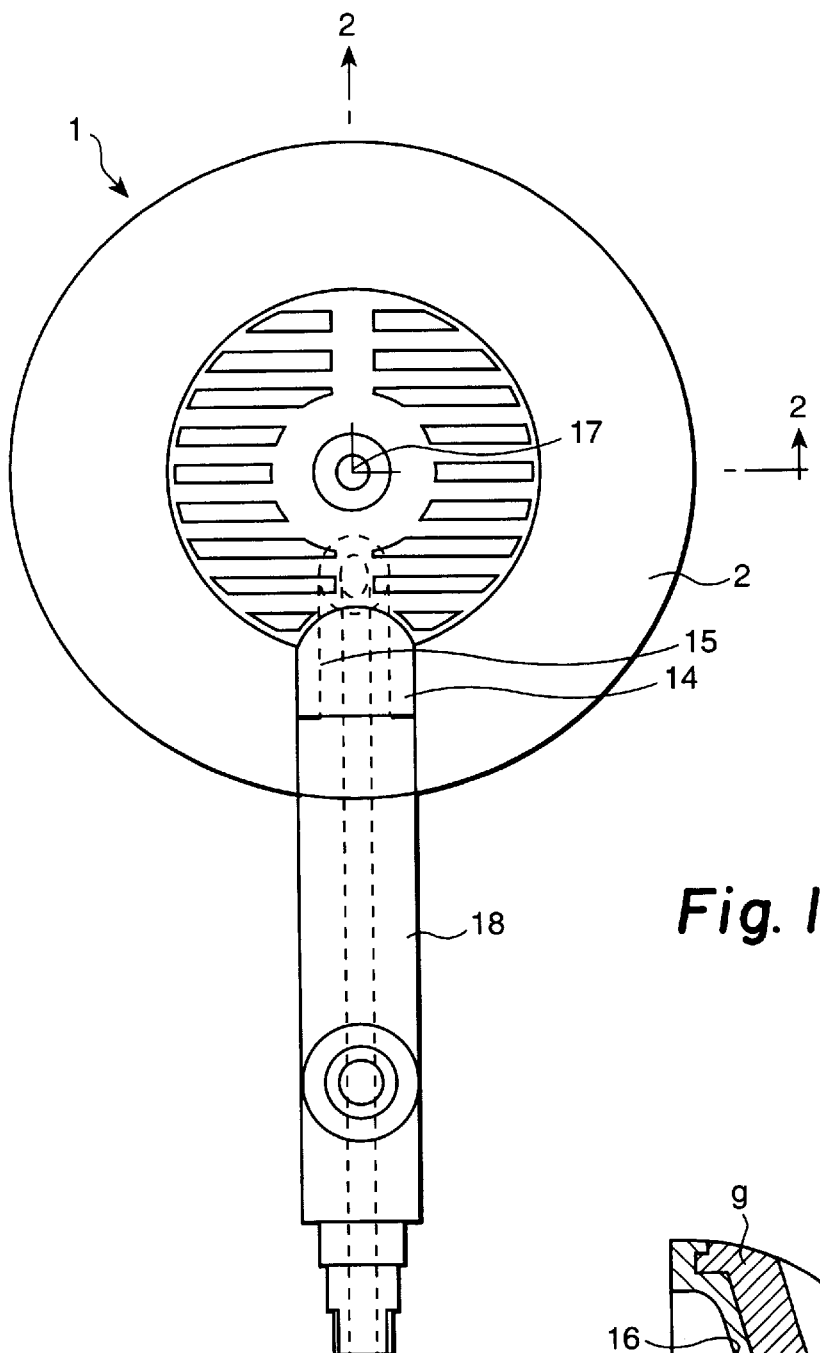
FIG. 1 is a diagrammatic, top view of the valve, the gas supply tube being indicated in a top view by means of dotted lines.
Figure 2:
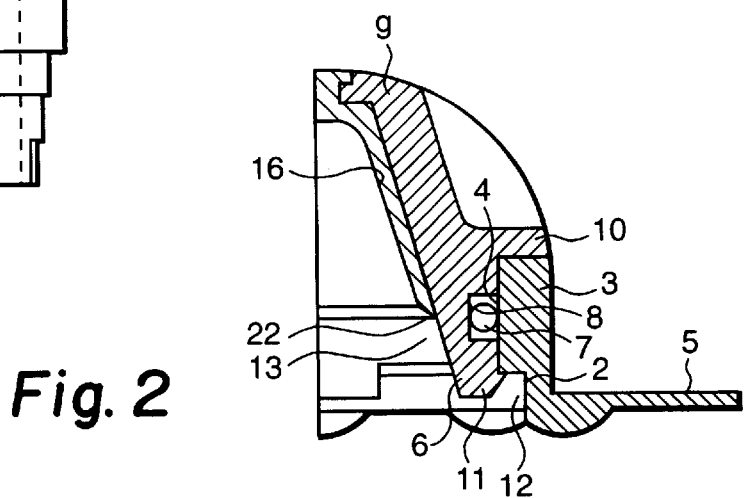
FIG. 2 is a side view of the valve F in FIG. 1 along the line 2—2 in FIG. 1.

An inflation valve 1 according to the invention is shown in FIGS. 1 and 2. The valve comprises a flange 2 formed of a tubular part 3 with a circular cylindrical opening 4 and a plate-shaped part 5 secured with the flange 2 on the side of a container (not shown).

The container may for instance be a sack, a bag or the like containers with non-rigid walls. These containers are usually formed of several layers of paper and plastic, wherein the individual layers may be laminated together or placed adjacent each other. The paper layers are intended as reinforcement of the container. The plastic sheets are normally polyethylene sheets, but other types of plastic sheets may used and arranged such inside the paper layer to ensure an airtight container. The sacks, bags or container are usually used to provide safety during transit in connection with storage compartments. The object of the containers is to fill out voids between the articles being loaded into the storage compartment, thus securing the cargo against movement during transit.

Furthermore the containers may serve as shock-absorbing elements, thus ensuring that the cargo arrives in an undamaged condition. Such containers are used within all types of cargo transport, for instance in shipping, container transport or haulage. The containers or bags may also be used as part of the packing of for instance large fragile machines. When the cargo has been loaded, the non-inflated containers are placed in between the individual cargo items. The containers are then pressurised by means of compressed air through the inflation valve. Normally only a slight overpressure is inflated. The size of the containers may vary, but it is usually between approximately 60×110 cm and approximately 100× 220 cm. The containers may usually be inflated up to a thickness of about 25 to 50 cm.

A filling nozzle 6 is adapted to be arranged in sealing engagement with the opening 4 of the tubular part 3. An O-ring 7 is preferably used as sealing element and arranged in a circumferential groove 8 in the filling nozzle 6. In the shown embodiment the filling nozzle 6 forms part of a valve body 9 and the filling nozzle 6 pivots freely in the opening 4.

A circumferential collar 10 is provided at the transition between the filling nozzle 6 and the valve body 9. On the side facing the container, the filling nozzle 6 is provided with snap connections 11 in form of a number of projecting protrusions (preferably three) which are peripherally evenly distributed and gripping under a circumferential rim 12 of the tubular part 3 when the filling nozzle 6 and the valve body 9 have been inserted into the opening 4 until the collar 10 engages the outer end face of the tubular part 3.

It is thus ensured that the valve body 9 with the filling nozzle 6 pivots freely continuously in relation to the tubular part 3 of the flange 2.

The entire valve body preferably extends slightly beyond the outer end face of the flange 2 in the axis direction of the tubular part 3. In the shown embodiment the valve body is frusto-conical along the inner wall 13 and provided with a gas supply passage 14 with an opening 15 substantially perpendicular to the axis direction of the valve body, said opening 15 extending from the interior of the valve body 9 to the outer face thereof. A conical valve member 16 is mounted inside conical valve body 9 and secured to the valve body 9 at the joint vertex 17 of the valve member 16 and the valve body 9. The valve member 16 thus covers the mouth of the gas supply passage 14 in the valve body 9.

Figure 3:
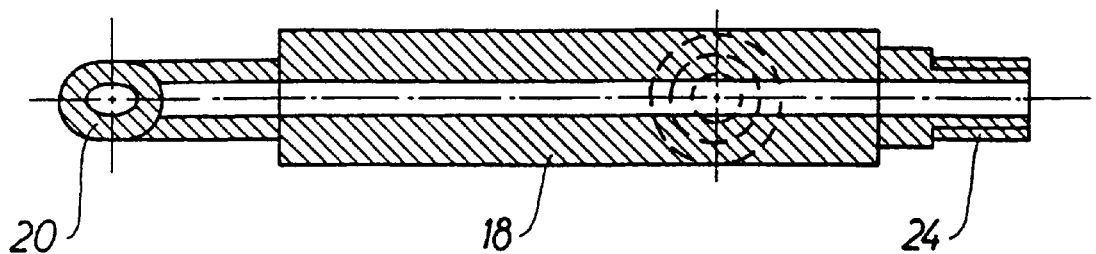
FIG. 3 is a top view of the gas supply tube and FIG. 4 is a side view of the gas supply tube.
Figure 4:
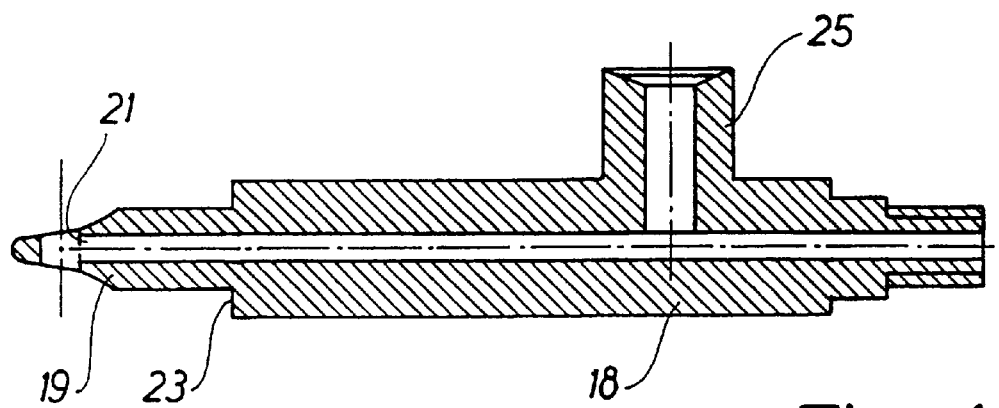

As shown in detail on FIGS. 3 and 4, a gas supply tube 18 has an end 19 which can be inserted into the gas supply passage 14, the opening 15 being shaped to snugly receive the end 19 of the gas supply 18. The insertion end 19 of the gas supply tube 18 is provided with a push means 20 keeping the mouth 21 of the gas supply 18 clear such that the mouth does not engage the valve flap or the valve member 16.

As previously mentioned, like the valve body 9 the valve member 16 is conical, the cone angle of the latter though being slightly larger, for instance 2°, such that in the closed state the contact with the valve body is obtained at the edge 22 facing the filling nozzle. However the valve member 16 is formed of a comparatively resilient plastic material, whereby the surface of contact in practice extends somewhat upward from this edge.

At the transition to the insertion end 19 the gas supply tube 18 is provided with a circumferential shoulder 23 forming a stop at the inlet to the gas supply tube 18 such that the push means 20 thereof deforms the valve member 16 just sufficiently to open the inflation valve without thereby damaging the valve member.

When the gas supply tube 18 thus is inserted into the gas supply passage 14 air can be inflated in a conventional manner through the inflation valve from a compressed air supply hose connected to the other end of the gas supply tube 18 for instance by means a thread 24. The gas supply tube 18 may continuously and also when compressed air is fed to the container pivot freely, as the filling nozzle is movable in the tubular part 3 of the flange 2.

As shown in FIGS. 3 and 4 the gas supply tube 18 is provided with a branch 25 for connecting a pressure gauge (not shown). The branch 25 comprises a closure plug (not shown) which can be screwed off and replaced by a connecting plug for such a pressure gauge.

The gas supply tube 18 may also pivot relative to the valve body 9 such that the branch 25 points in a suitable direction to obtain easy access thereto.

Furthermore the gas supply passage 14 may be slightly conical, eg 2°, and the end of the gas supply tube 18 being inserted into the gas supply passage 14 may have a corresponding conical shape. As a result the insertion of the gas supply tube 18 into the valve body 9 is facilitated.

I claim:

1. An inflation valve (1) for sacks, bags or the like containers with non-rigid walls, said containers to be pressurised, preferably with air pressure, said inflation valve comprising a flange (2) formed of a tubular part (3) with a circular cylindrical opening (4) and a plate-shaped part (5) with which the flange (2) is secured to the container; a filling nozzle (6) adapted to be arranged in sealing engagement in the opening (4) of the tubular part (3) by means of a snap connection (11,12), characterised in that the filling nozzle (6) may pivot freely in the opening and forms part of or is connected to a valve body (9) extending slightly beyond the outer end of the tubular part (3) in the axis direction of the flange (2) and perpendicular to this axis direction is provided with the gas supply passage (14) with a snugly fitting opening (15) for receiving a gas supply tube (18), one end (19) thereof adapted to mechanically open a valve flap (16) at the insertion of the gas supply tube (18), said flap mounted inside the valve body (9) and normally keeping the gas supply passage (14) closed due to elastic material or mounting of the valve flap.

2. An inflation valve as claimed in claim 1, characterised in that a circumferential collar (10) abutting the outer end of the tubular part (3) is provided at the connection between the filling nozzle (6) and the valve body (9), and that a sealing ring (7) is provided in a circumferential groove (8) in the filling nozzle (6) for sealing engagement with the tubular part (3) of the flange (2).

3. An inflation valve as claimed in claim 1, characterised in that interior (13) of the valve body (9) is formed as conical surface having a axis co-axial with the flange (2) and with the vertex (17) facing away from the flange (2) and that the valve flap (16) comprises a conical valve member (16) arranged inside the conical surface (13) of the valve body (9), the conical tip (17) being secured at the conical tip (17) of the valve body.

4. An inflation valve as claimed in claim 3, characterised in that the cone angle of the valve member (16) slightly exceeds the cone angle of the valve body (9), whereby the valve member (16) in its closed state abuts the valve body (9) at the edge (22) facing the filling nozzle.

5. An inflation valve as claimed in claim 1, characterised in that the gas supply tube (18) is provided with a branch (25) for connecting a pressure gauge.

6. An inflation valve as claimed in claim 2, characterised in that the sealing ring is an O-ring (7).

7. An inflation valve as claimed in claim 1, characterised in that the end of the gas supply tube (18) opening the valve flap or the valve member (16) is provided with a push means (20) preventing the mouth of the gas supply tube (18) from engaging the valve flap or the valve member (16).

8. An inflation valve as claimed in claim 1, characterised in that the gas supply tube (18) is provided with a stop means (23) abutting the mouth of the gas supply passage (14) in the valve body (9) at inserted of the gas supply tube.

* * * * *